(12) United States Patent
Su et al.

(10) Patent No.: US 11,500,179 B2
(45) Date of Patent: Nov. 15, 2022

(54) IMAGING LENS AND ELECTRONIC DEVICE HAVING THE SAME

(71) Applicant: HON HAI PRECISION INDUSTRY CO., LTD., New Taipei (TW)

(72) Inventors: Yu-Chung Su, New Taipei (TW); Chun-Cheng Ko, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 400 days.

(21) Appl. No.: 16/884,396

(22) Filed: May 27, 2020

(65) Prior Publication Data
US 2020/0379215 A1    Dec. 3, 2020

(30) Foreign Application Priority Data

May 30, 2019    (CN) .......................... 201910463261.X

(51) Int. Cl.
*G02B 9/62* (2006.01)
*G02B 3/04* (2006.01)
*G02B 1/04* (2006.01)

(52) U.S. Cl.
CPC ............... *G02B 9/62* (2013.01); *G02B 1/04* (2013.01); *G02B 3/04* (2013.01)

(58) Field of Classification Search
CPC ............... G02B 9/63; G02B 1/04; G02B 3/04
See application file for complete search history.

(56) References Cited

U.S. PATENT DOCUMENTS

| | | | |
|---|---|---|---|
| 2015/0241659 A1* | 8/2015 | Huang | G02B 13/0045 359/713 |
| 2017/0082833 A1* | 3/2017 | Huang | G02B 13/0045 |
| 2019/0154974 A1* | 5/2019 | Chen | G02B 27/0037 |
| 2019/0170966 A1* | 6/2019 | Wenren | G02B 9/64 |

* cited by examiner

*Primary Examiner* — Anne M Hines
(74) *Attorney, Agent, or Firm* — ScienBiziP, P.C.

(57) ABSTRACT

A high-resolution imaging lens proofed against high-temperature instability includes a first lens with a negative power, a second lens with a negative power, a third lens with a positive power, a fourth lens with a negative power, a fifth lens with a positive power, and a sixth lens with a positive power. The first to the sixth lenses satisfy conditions of F1<0; 0.8>|F2/F6|>0.6, F2<0, F6>0; −3>F4/F5>−2, and 2.0<F/#. Each of the first lens, the third lens, the fourth lens, and the fifth lens is made of glass, each of the second lens and the sixth lens is made of plastic.

20 Claims, 12 Drawing Sheets

IMAGING LENS AND ELECTRONIC DEVICE HAVING THE SAME

FIELD

The subject matter relates to optical technologies, and more particularly, to an imaging lens and an electronic device having the imaging lens.

BACKGROUND

Electronic devices, such as vehicles, tablet computers, and mobile phones, may be equipped with imaging lenses. The electronic devices need higher quality imaging lenses.

BRIEF DESCRIPTION OF THE DRAWINGS

Implementations of the present technology will now be described, by way of example only, with reference to the attached figures.

DETAILED DESCRIPTION

Figure 1:
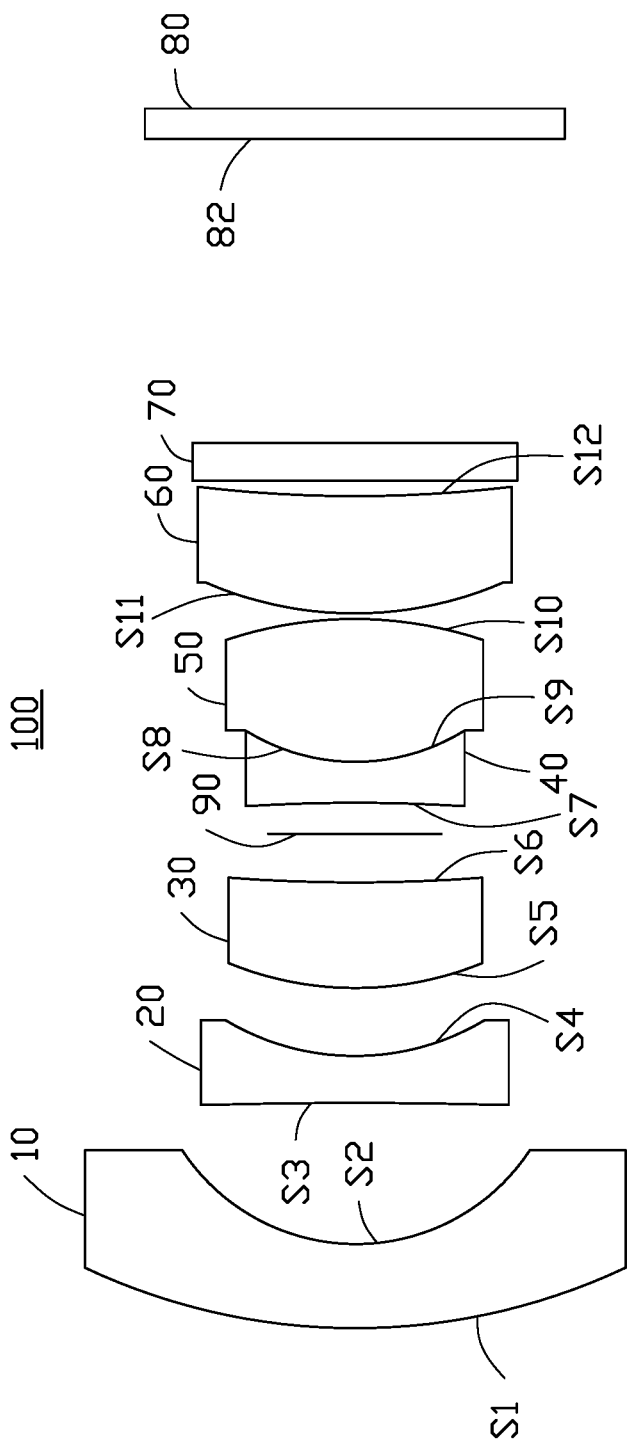
FIG. 1 is a diagrammatic view of an embodiment of an imaging lens according to the present disclosure.

It will be appreciated that for simplicity and clarity of illustration, where appropriate, reference numerals have been repeated among the different figures to indicate corresponding or analogous components. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

FIG. 1 illustrates an embodiment of an imaging lens 100 according to the present disclosure. The imaging lens 100 includes, from an object side to an imaging side, a first lens 10 with a negative power, a second lens 20 with a negative power, a third lens 30 with a positive power, a fourth lens 40 with a negative power, a fifth lens 50 with a positive power, a sixth lens 60 with a positive power, a filter 70, and an imaging surface 80. Light may pass through the first lens 10, the second lens 20, the third lens 30, the fourth lens 40, the fifth lens 50, the sixth lens 60, and the filter 70 in sequence, to form an image on the imaging surface 80.

The first lens 10 includes a first surface S1 and a second surface S2 opposite to the first surface S1 from the object side to the imaging side. The second lens 20 includes a third surface S3 and a fourth surface S4 opposite to the third surface S3 from the object side to the imaging side. The third lens 30 includes a fifth surface S5 and a sixth surface S6 opposite to the fifth surface S5 from the object side to the imaging side. The fourth lens 40 includes a seventh surface S7 and an eighth surface S8 opposite to the seventh surface S7 from the object side to the imaging side. The fifth lens 50 includes a ninth surface S9 and a tenth surface S10 opposite to the ninth surface S9 from the object side to the imaging side. The sixth lens 60 includes an eleventh surface S11 and a twelfth surface S12 opposite to the eleventh surface S11 from the object side to the imaging side.

The first surface S1 is convex toward the object side. The second surface S2 is concave toward the imaging side. The third surface S3 is concave toward the object side. The fourth surface S4 is concave toward the imaging side. The fifth surface S5 is convex toward the object side. The sixth surface S6 is concave toward the imaging side. The seventh surface S7 is concave toward the object side. The eighth surface S8 is concave toward the imaging side. The ninth surface S9 is convex toward the object side. The tenth surface S10 is convex toward the imaging side. The eleventh surface S11 is convex toward the object side. The twelfth surface S12 is concave toward the imaging side.

Furthermore, at least one of the third surface S3, the fourth surface S4, the eleventh surface S11, and the twelfth surface S12 is aspherical. In at least one embodiment, each of the third surface S3, the fourth surface S4, the eleventh surface S11, and the twelfth surface S12 is aspherical.

In at least one embodiment, the fourth lens 40 and the fifth lens 50 are connected to each other by an adhesive.

The filter 70 filters infrared rays from light exiting from the sixth lens 60. Furthermore, the imaging lens 100 further includes a cover glass 82 at a side of the imaging surface 80 facing the filter 70. The cover glass 82 protects a sensing element (not shown) on the imaging surface 80.

The first lens 10, the second lens 20, the fourth lens 40, the fifth lens 50, and the sixth lens 60 satisfy the following numbered conditions:

$$F1<0; \tag{1}$$

$$0.8>|F2/F6|>0.6, F2<0, F6>0; \tag{2}$$

$$-3>F4/F5>-2; \tag{3}$$

$$2.0<F/\#. \tag{4}$$

Wherein F1 denotes an effective focal length of the first lens 10, F2 denotes an effective focal length of the second lens 20, F4 denotes an effective focal length of the fourth lens 40, F5 denotes an effective focal length of the fifth lens 50, F6 denotes an effective focal length of the sixth lens 60, and F/# denotes the number of apertures.

When the condition (1) is satisfied, the imaging lens 100 has a large field of view. When the condition (2) is satisfied, a ratio of the focal length of the second lens 20 and the focal length of the sixth lens 60 is controlled to prevent a resolution of the imaging lens 100 from being affected by temperature. When the condition (3) is satisfied, the imaging lens 100 has good aberration-corrected effect.

Furthermore, the first lens 10, the second lens 20, the third lens 30, the fourth lens 40, the fifth lens 50, and the sixth lens 60 of the imaging lens 100 also satisfy at least one of the following numbered conditions:

$$-2<R1/F1<-1, -0.7<R2/F1<0; \quad (5)$$

$$-3<R3/F2<-1, -0.7<R4/F2<0; \quad (6)$$

$$0.5<R5/F3<0.8, 6<R6/F3<10; \quad (7)$$

$$2<R7/F4<5, -0.3<R8/F4<0; \quad (8)$$

$$0.2<R9/F5<0.4, -0.8<R10/F5<-0.5; \quad (9)$$

$$0<R11/F6<0.4, 1.5<R12/F6<2.2. \quad (10)$$

Wherein R1 denotes a radius of curvature of the first surface S1. R2 denotes a radius of curvature of the second surface S2. R3 denotes a radius of curvature of the third surface S3. R4 denotes a radius of curvature of the fourth surface S4. R5 denotes a radius of curvature of the fifth surface S5. R6 denotes a radius of curvature of the sixth surface S6. R7 denotes a radius of curvature of the seventh surface S7. R8 denotes a radius of curvature of the eighth surface S8. R9 denotes a radius of curvature of the ninth surface S9. R10 denotes a radius of curvature of the tenth surface S10. R11 denotes a radius of curvature of the eleventh surface S11. R12 denotes a radius of curvature of the twelfth surface S12. F3 denotes an effective focal length of the third lens 30.

When any one of the conditions (5), (6), (7), (8), (9), and (10) is satisfied, the imaging lens 100 captures high relative illuminance, a relatively large field of view, and a better imaging quality.

In at least one embodiment, a stop 90 is positioned between the third lens 30 and the fourth lens 40, which limits flux of luminosity of light that enters the fourth lens 40 and allows the pencil-shaped beam of light to be more symmetrical. Thus, a coma of the imaging lens 100 is corrected.

In at least one embodiment, a light transmittance of plastic is greater than that of glass. Furthermore, high-temperature stability of glass is better than that of plastic, that is, glass is less likely to be affected by high temperature. For these reasons, each of the first lens 10, the third lens 30, the fourth lens 40, and the fifth lens 50 is made of glass. Each of the second lens 20 and the sixth lens 60 is made of plastic. Since the first lens 10 is in contact with the outside environment, the imaging lens 100 is thus less susceptible to high temperatures or large temperatures swings than when the first lens 10 is made of glass. In addition, to prevent the stop 90 from being affected by high temperature, the plastic lenses should be disposed away from the stop 90. Therefore, the third lens 30 and the fourth lens 40 are made of glass.

Furthermore, since the fifth lens 50 and the fourth lens 40 are in contact each other, the fifth lens 50 is made of glass, and the second lens 20 and the sixth lens 60 are made of plastic. As such, the imaging lens 100 has a high stability and a high imaging quality even under high temperatures.

Embodiment 1

The imaging lens 100 of Embodiment 1 satisfies the conditions shown in the following Table 1, Table 2, and Table 3. D shown in Table 1 denotes an axial distance from a current surface to the next surface. A4, A6, A8, A10, and A12 shown in Table 2 denote aspherical coefficients of the third surface S3, the fourth surface S4, the eleventh surface S11, and the twelfth surface S12, respectively. In the embodiment, an overall focal length F of the imaging lens 100 is equal to 3.9 mm. The number of apertures F/# is equal to 2.46. The field of view 2ω of the imaging lens 100 is equal to 97.2 degrees.

TABLE 1

| Surface | Shape | Radius of curvature (mm) | D (mm) |
| --- | --- | --- | --- |
| Object side | — | infinite | — |
| S1 | spherical | 9.500 | 1.371 |
| S2 | spherical | 3.300 | 2.150 |
| S3 | aspherical | 17.315 | 0.750 |
| S4 | aspherical | 3.683 | 1.063 |
| S5 | spherical | 5.048 | 1.657 |
| S6 | spherical | 50.000 | 0.740 |
| Stop 90 | — | infinite | 0.46 |
| S7 | spherical | −95.250 | 0.671 |
| S8 | spherical | 3.156 | 0.000 |
| S9 | spherical | 3.156 | 2.203 |
| S10 | spherical | −6.267 | 0.110 |
| S11 | aspherical | 5.700 | 1.830 |
| S12 | aspherical | 25.000 | 0.230 |
| filter 70 | — | infinite | 0.550 |
| Cover glass 82 | — | infinite | 0.400 |
| Imaging surface 80 | — | infinite | 0.045 |

TABLE 2

| Aspherical coefficient | S3 | S4 | S11 | S12 |
| --- | --- | --- | --- | --- |
| A4 | −5.58E−03 | −5.21E−03 | −8.11E−04 | 9.20E−04 |
| A6 | 1.37E−03 | −1.06E−03 | 5.34E−04 | 1.10E−04 |
| A8 | −1.16E−03 | 2.14E−03 | −4.68E−04 | −2.17E−04 |
| A10 | −1.96E−05 | −8.51E−05 | 1.81E−04 | 8.20E−05 |
| A12 | 1.58E−04 | 4.94E−04 | −3.88E−05 | −1.68E−05 |

TABLE 3

| F(mm) | F/# | 2ω |
| --- | --- | --- |
| 3.9 | 2.46 | 97.2 |

Figure 2:
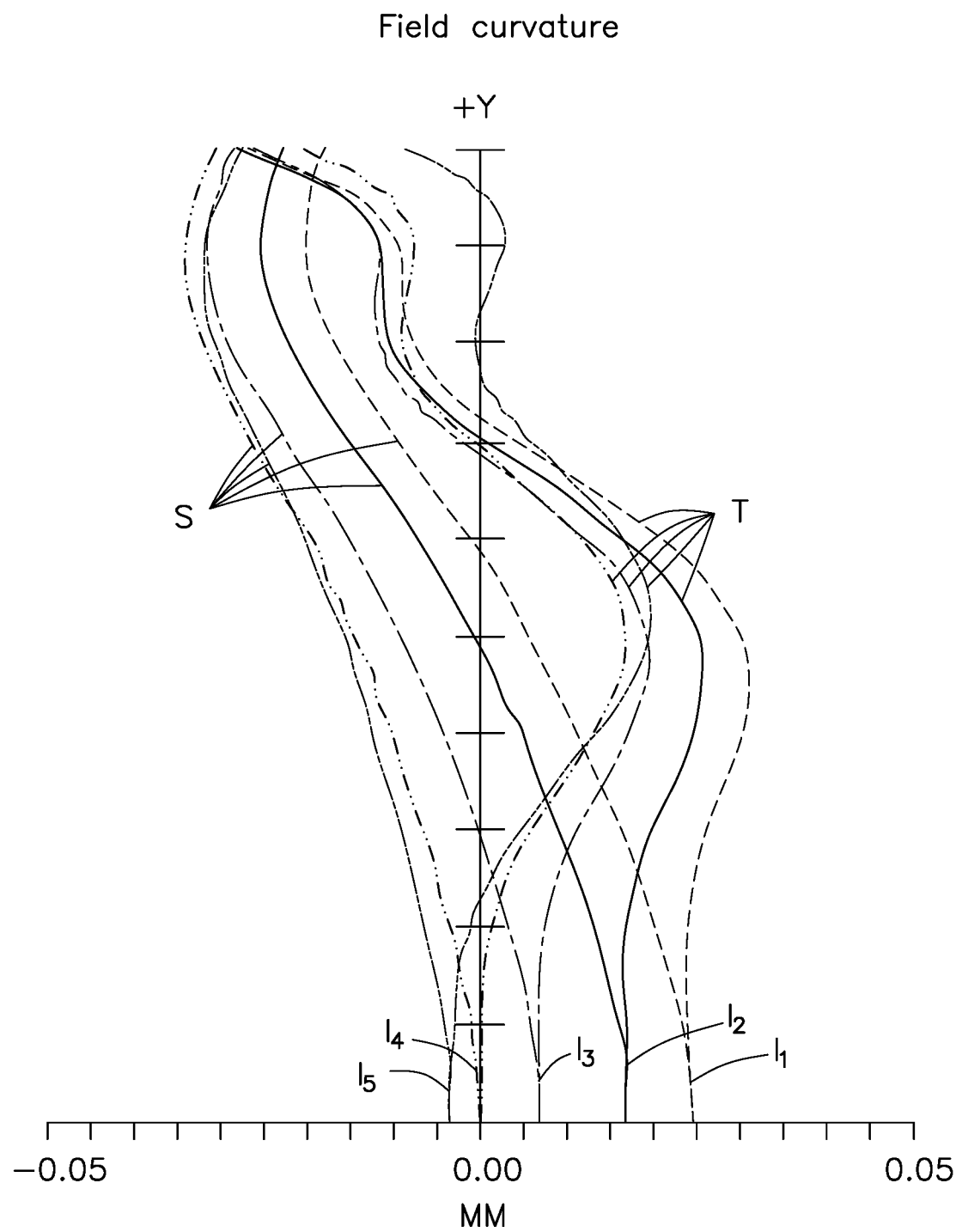
FIG. 2 is a diagram of field curvatures of the imaging lens of Embodiment 1.
Figure 3:
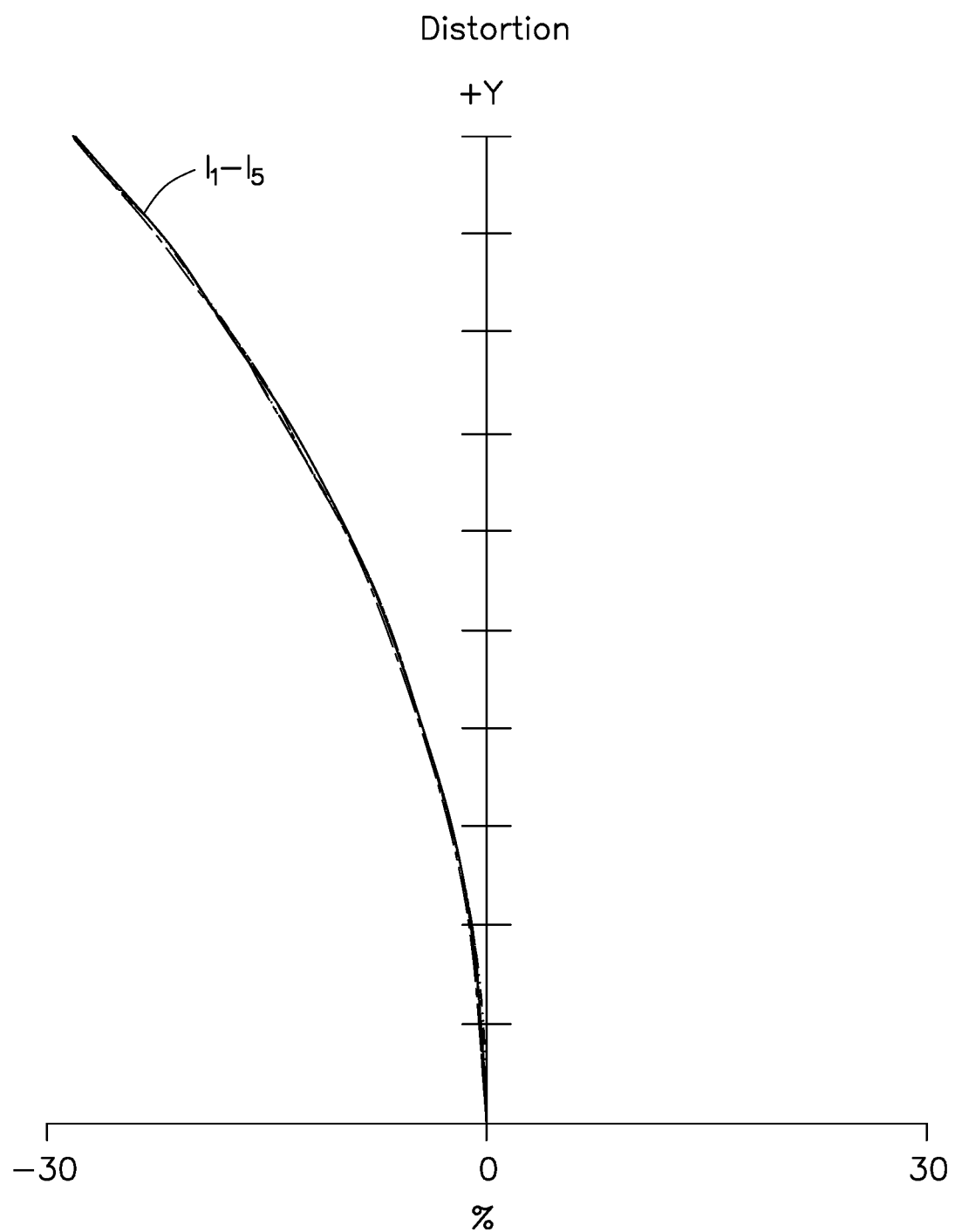
FIG. 3 is a diagram of distortions of the imaging lens of Embodiment 1.

Referring to FIGS. 2 and 3, field curvature and distortion of the imaging lens 100 of Embodiment 1 at wavelengths of 650 nm, 610 nm, 555 nm, 510 nm, and 470 nm are shown. In FIG. 2, the five curves T represent tangential field curvatures, the five curves S represent sagittal field curvatures, and l1, l2, l3, l4, and l5 represent test results of field curvatures at wavelengths of 650 nm, 610 nm, 555 nm, 510 nm, and 470 nm, respectively. As shown in FIG. 2, the tangential field curvatures and the maximum sagittal field curvatures of the imaging lens 100 are held within a range of (−0.041 mm, +0.035 mm). As shown in FIG. 3, the distortion of the imaging lens 100 is within −30%.

Figure 4:
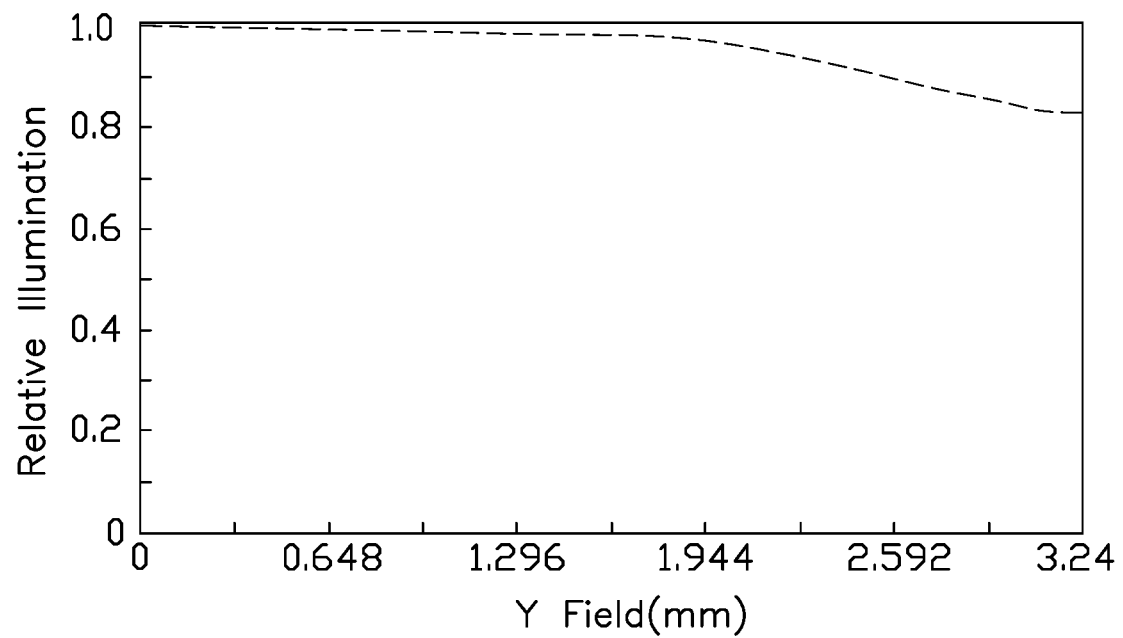
FIG. 4 is a diagram of relative illuminations of the imaging lens of Embodiment 1.

Referring to FIG. 4, a relative illumination of the imaging lens 100 of Embodiment 1 is greater than 82%, even at peripheral portions of the imaging lens 100. The high relative illumination allows the imaging lens 100 to form images of uniform brightness without dark corners.

Figure 5A:
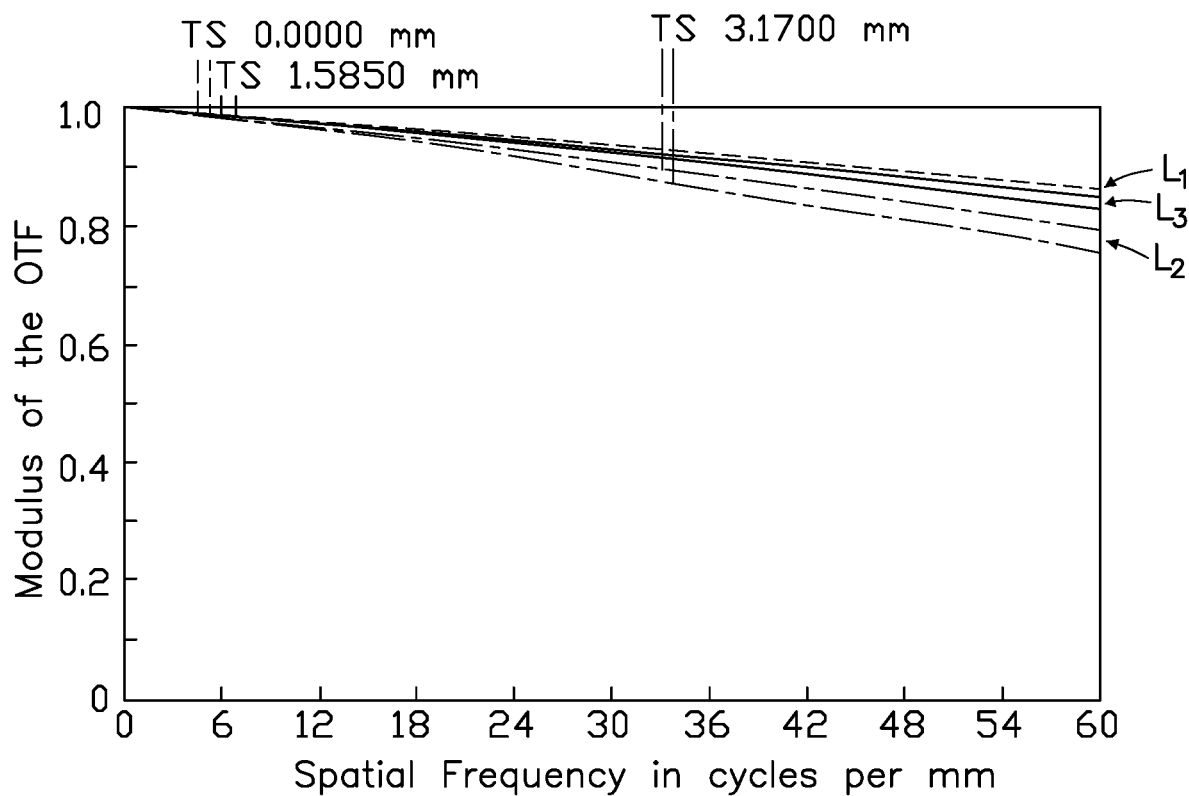
FIG. 5A is a diagram of Modulation Transfer Function (MTF) curves of the imaging lens of Embodiment 1, at a temperature of 20 degrees Celsius and ½ frequency of a spatial frequency of 60 lp/mm.
Figure 5B:
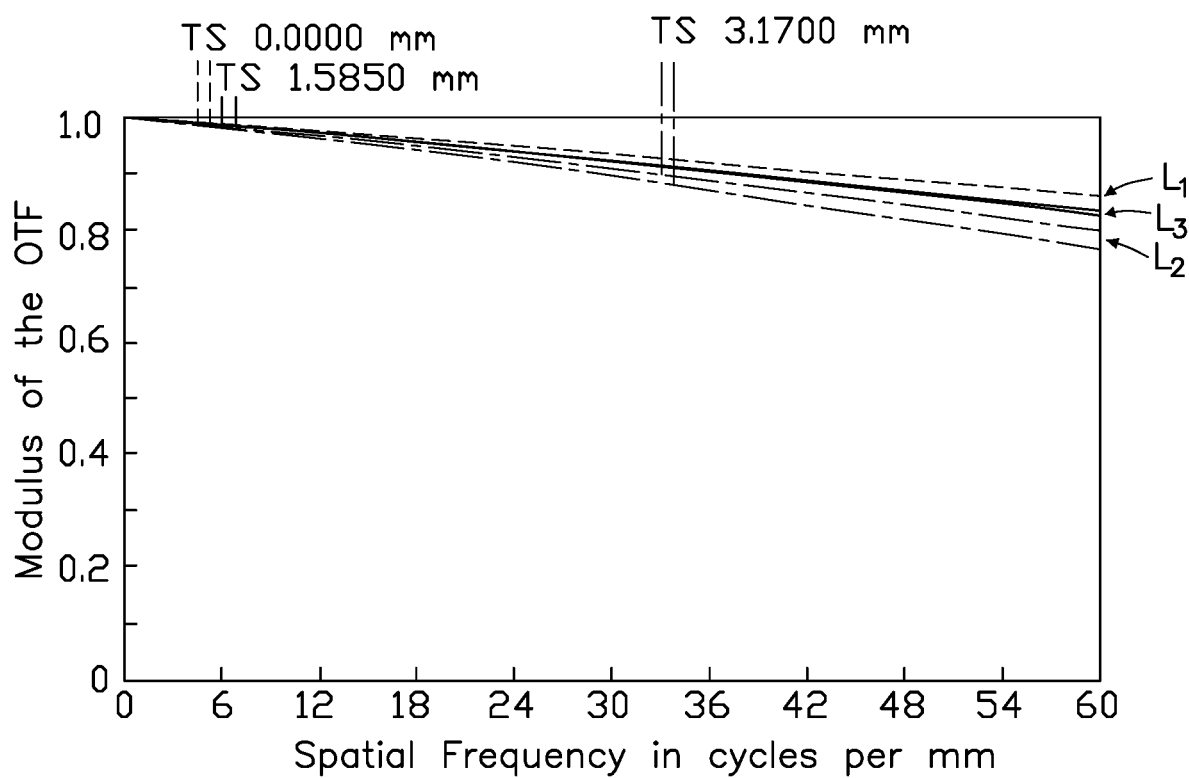
FIG. 5B is a diagram of Modulation Transfer Function (MTF) curves of the imaging lens of Embodiment 1, at a temperature of 50 degrees Celsius and ½ frequency of the spatial frequency of 60 lp/mm.

Referring to FIGS. 5A and 5B, the MTF curves of the imaging lens 100 of Embodiment 1 are shown. As shown by curve $L_1$ in FIG. 5A, when the imaging lens 100 is tested under a temperature of 20 degrees Celsius, the MTF value of the central field of view of the imaging lens 100 is greater than 86%. As shown by curve $L_2$ in FIG. 5A, the MTF value of the corner field of view is greater than 75%. As shown by curve $L_3$ in FIG. 5A, the MTF values between the central field of view and the corner field of view are from 75% to 86%. As shown by curve $L_1$ of FIG. 5B, when the imaging lens 100 is tested under 20 degrees Celsius, the MTF value of the central field of view of the imaging lens 100 is greater than 86%. As shown by curve $L_2$ of FIG. 5B, the MTF value of the corner field of view is greater than 78%. As shown by curve $L_3$ of FIG. 5B, The MTF values between the central field of view and the corner field of view are from 78% to 86%. Thus, the imaging lens 100 of Embodiment 1 has high-resolution imaging quality.

Embodiment 2

The imaging lens 100 of Embodiment 2 satisfies the conditions shown in Table 4, Table 5, and Table 6. In the embodiment, an overall focal length F of the imaging lens 100 is equal to 3.92 mm. The number of apertures F/# is equal to 2.47. The field of view 2ω of the imaging lens 100 is equal to 97 degrees.

TABLE 4

| Surface | Shape | Radius of curvature (mm) | D (mm) |
|---|---|---|---|
| Object side | — | infinite | — |
| S1 | spherical | 9.500 | 1.371 |
| S2 | spherical | 3.300 | 2.100 |
| S3 | aspherical | 12.184 | 0.795 |
| S4 | aspherical | 3.440 | 1.298 |
| S5 | spherical | 4.920 | 1.422 |
| S6 | spherical | 46.003 | 0.740 |
| Stop 90 | — | infinite | 0.46 |
| S7 | spherical | −60.456 | 0.750 |
| S8 | spherical | 3.051 | 0.000 |
| S9 | spherical | 3.051 | 2.124 |
| S10 | spherical | −7.395 | 0.110 |
| S11 | aspherical | 4.900 | 1.830 |
| S12 | aspherical | 25.558 | 0.230 |
| filter 70 | — | infinite | 0.550 |
| Cover glass 82 | — | infinite | 0.400 |
| Imaging surface 80 | — | infinite | 0.045 |

TABLE 5

| Aspherical coefficient | S3 | S4 | S11 | S12 |
|---|---|---|---|---|
| A4 | −7.78E−03 | −9.04E−03 | −5.68E−04 | 2.65E−03 |
| A6 | −7.49E−04 | 1.90E−04 | 9.14E−04 | 1.52E−04 |
| A8 | 1.43E−03 | 1.52E−03 | −6.22E−04 | −1.71E−04 |
| A10 | −7.33E−04 | −1.25E−03 | 2.10E−04 | 5.30E−05 |
| A12 | 1.18E−04 | 5.7E−04 | −2.68E−05 | −0.60E−05 |

TABLE 6

| F(mm) | F/# | 2ω |
|---|---|---|
| 3.92 | 2.47 | 97 |

Figure 6:
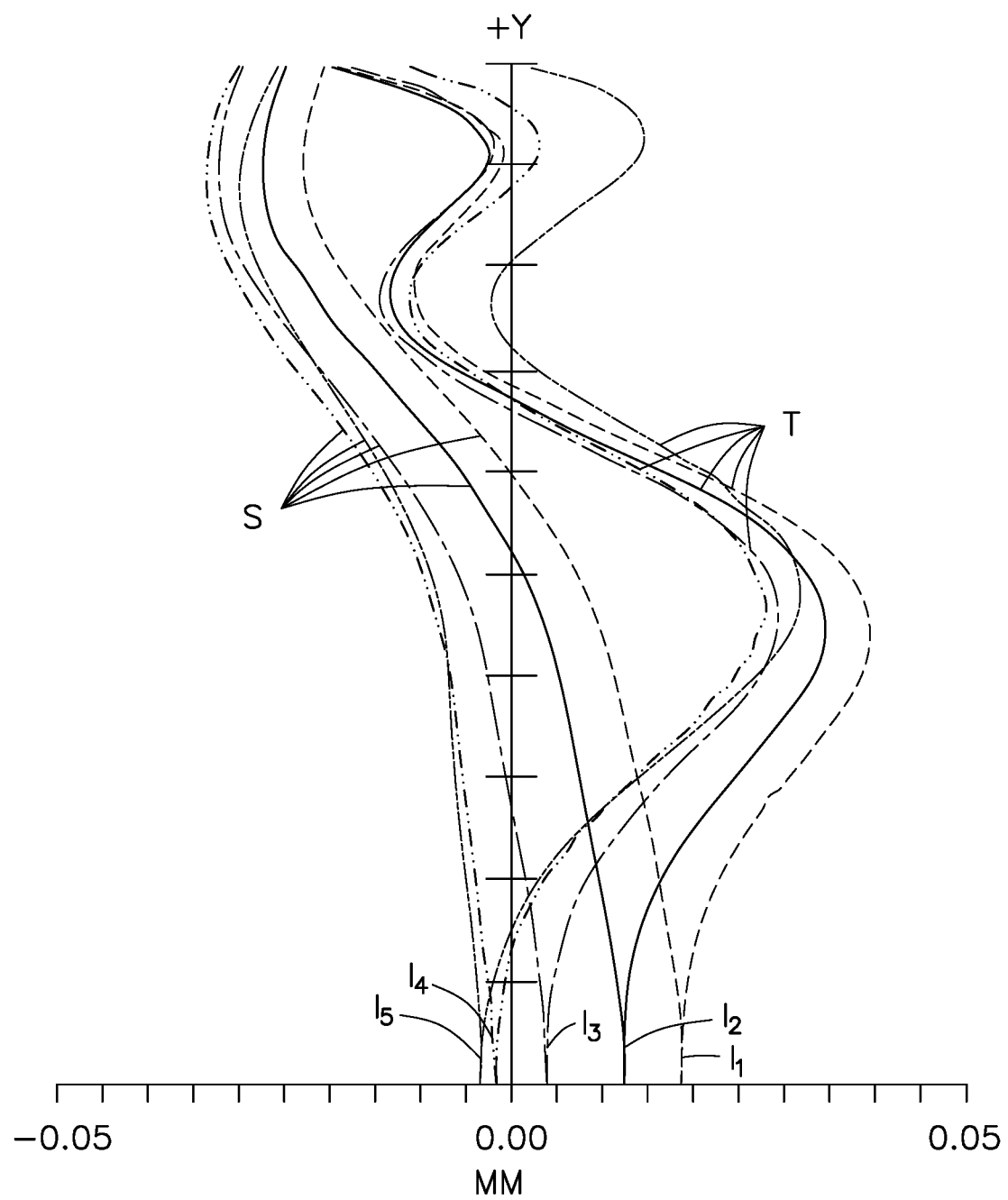
FIG. 6 is a diagram of field curvatures of the imaging lens of Embodiment 2.
Figure 7:
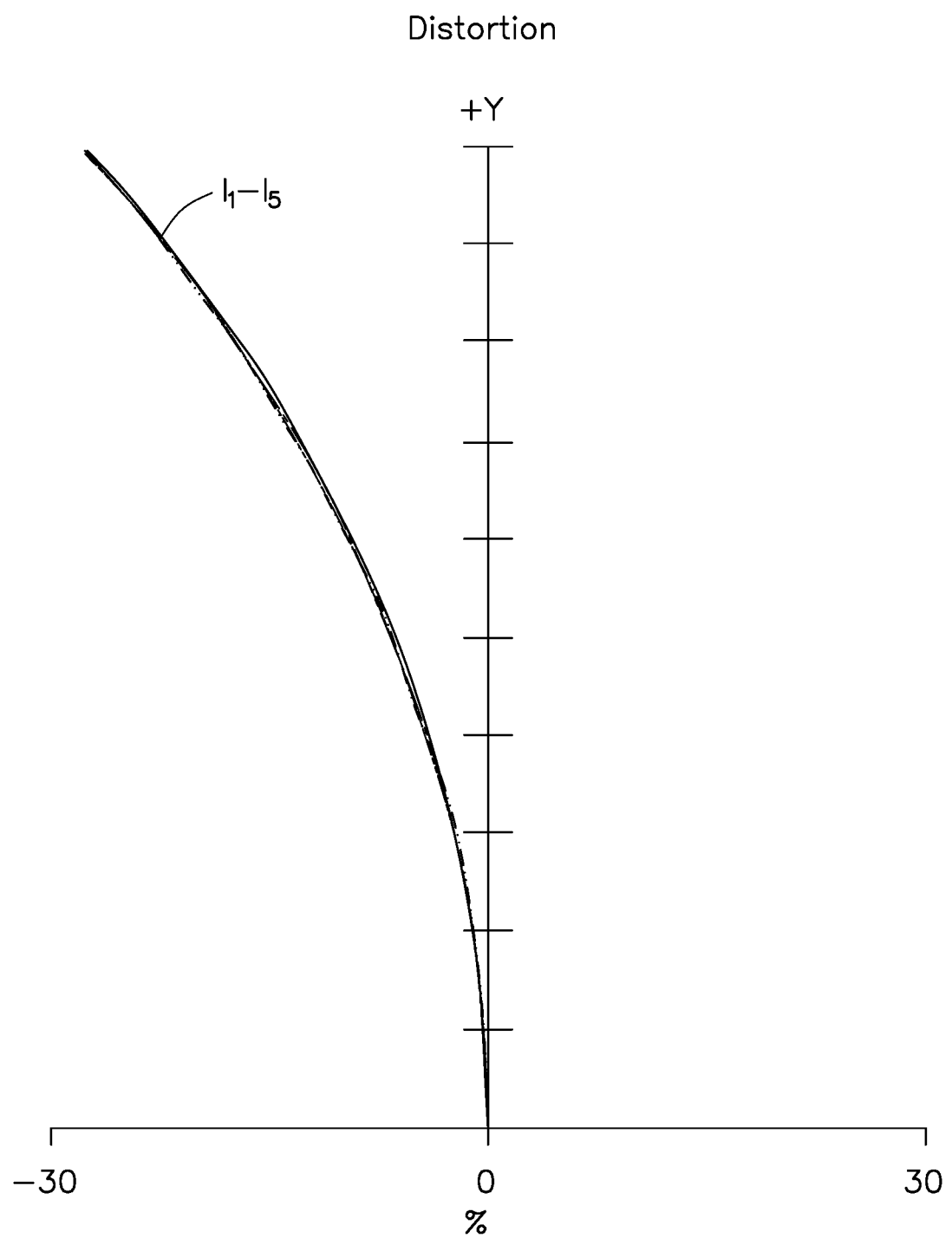
FIG. 7 is a diagram of distortions of the imaging lens of Embodiment 2.

Referring to FIGS. 6 and 7, field curvature and distortion of the imaging lens 100 of Embodiment 2 at wavelengths of 650 nm, 610 nm, 555 nm, 510 nm, and 470 nm are shown. As shown in FIG. 6, the tangential field curvatures and the maximum sagittal field curvatures of the imaging lens 100 are both held within a range of (−0.034 mm, +0.04 mm). As shown in FIG. 7, the distortion of the imaging lens 100 is within −30%.

Figure 8:
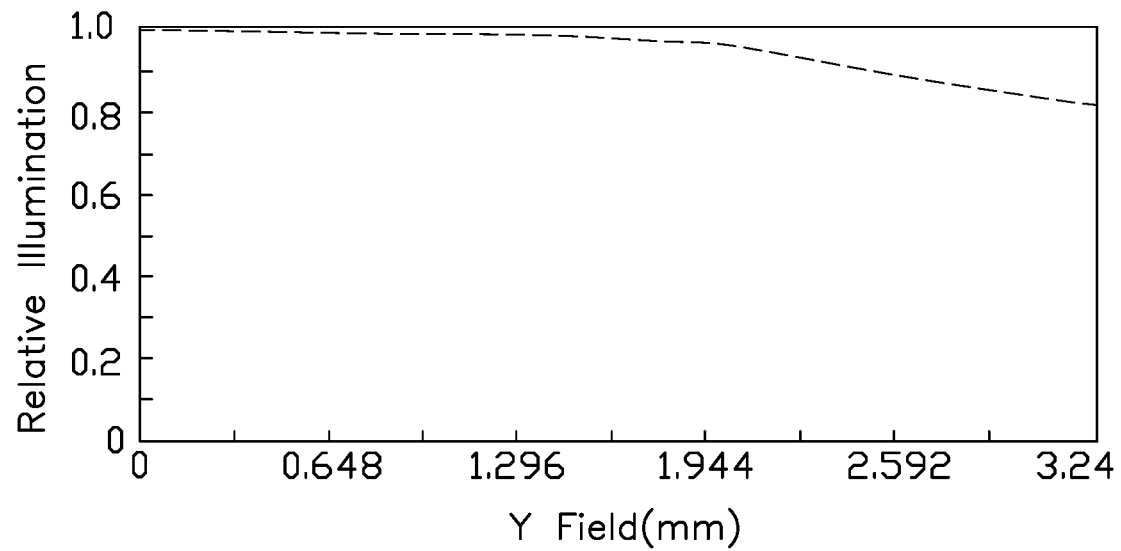
FIG. 8 is a diagram of relative illuminations of the imaging lens of Embodiment 2.

Referring to FIG. 8, a relative illumination of the imaging lens 100 of Embodiment 2 is greater than 83%, even at peripheral portions of the imaging lens 100. The high relative illumination allows the imaging lens 100 to form images of uniform brightness and without dark corners.

Figure 9A:
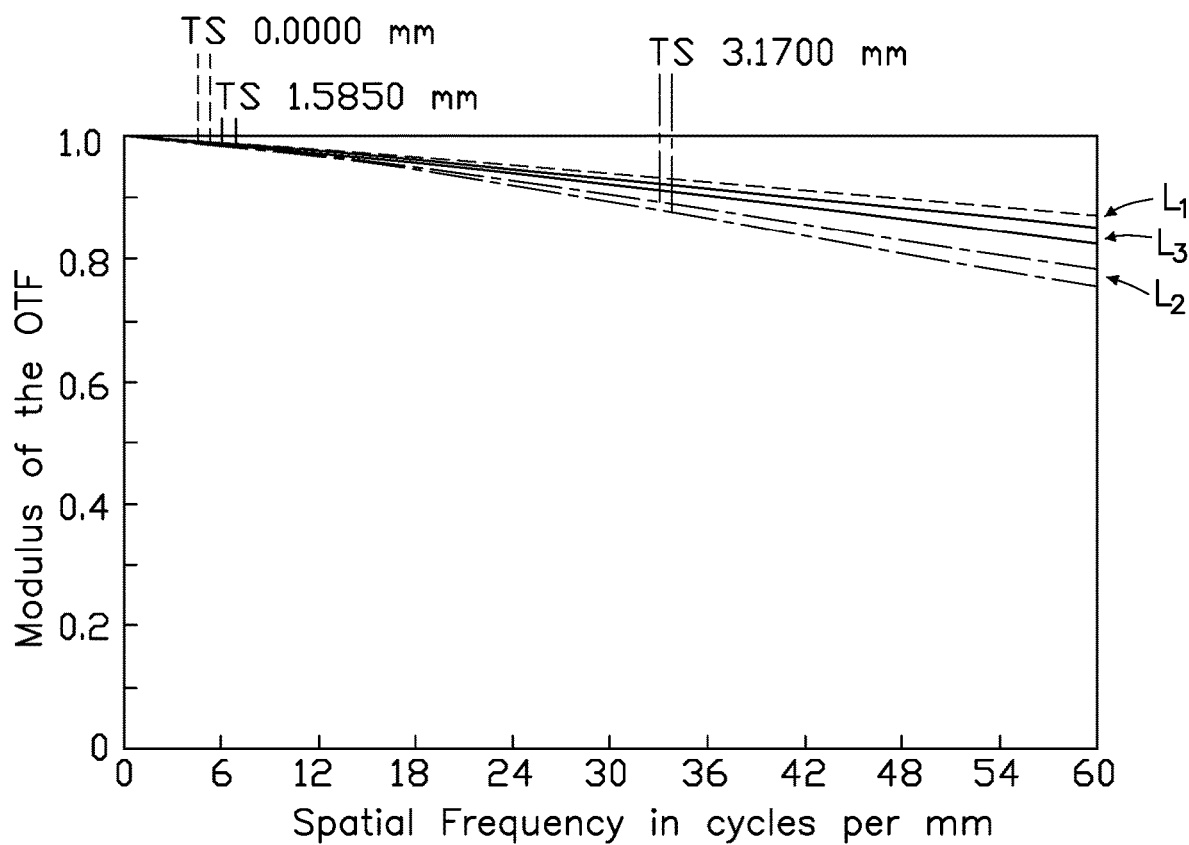
FIG. 9A is a diagram of Modulation Transfer Function (MTF) curves of the imaging lens of Embodiment 2, at a temperature of 20 degrees Celsius and ½ frequency of a spatial frequency of 60 lp/mm.
Figure 9B:
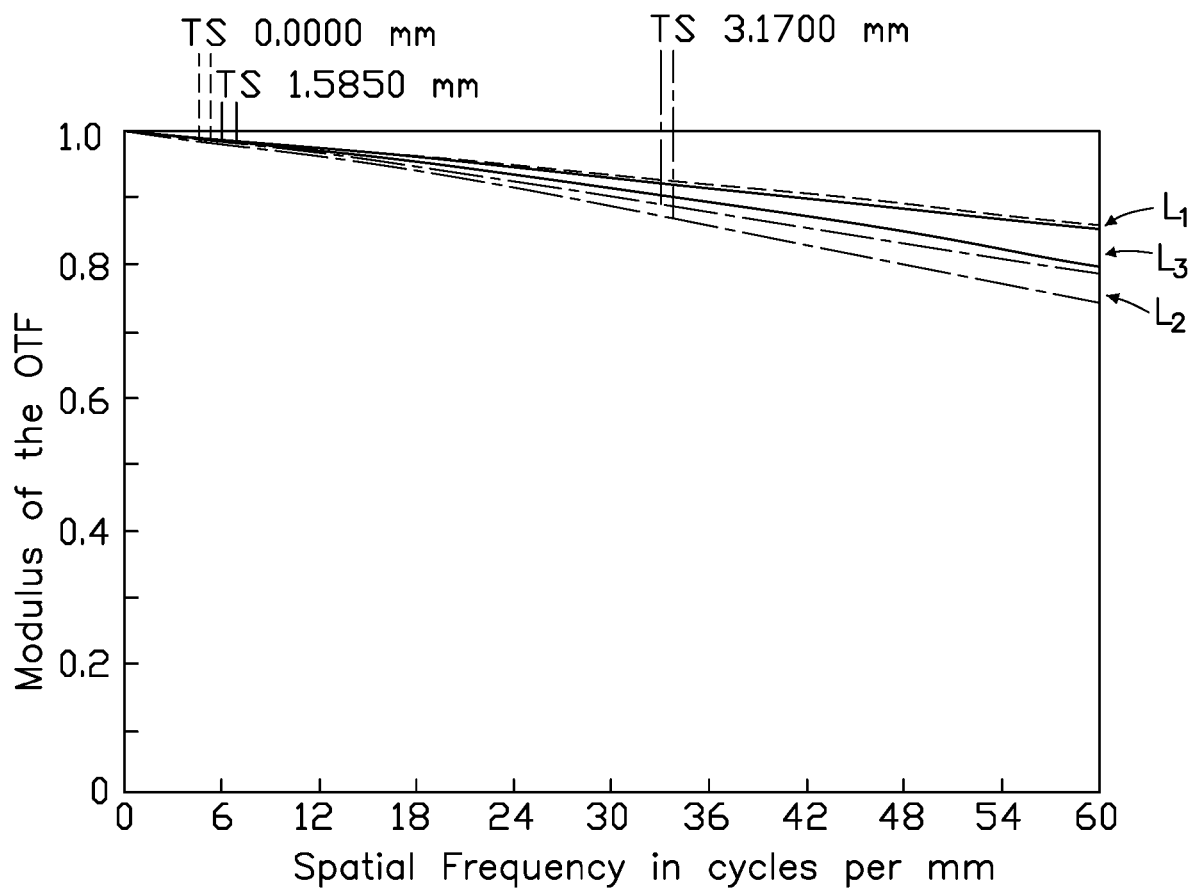
FIG. 9B is a diagram of Modulation Transfer Function (MTF) curves of the imaging lens of Embodiment 2, at a temperature of 50 degrees Celsius and ½ frequency of the spatial frequency of 60 lp/mm.

Referring to FIGS. 9A and 9B, the MTF curves of the imaging lens 100 of Embodiment 2 are shown. As shown by curve $L_1$ in FIG. 9A, when the imaging lens 100 is tested under a temperature of 20 degrees Celsius, the MTF value of the central field of view of the imaging lens 100 is greater than 88%. As shown by curve $L_2$ in FIG. 9A, the MTF value of the corner field of view is greater than 75%. As shown by curve $L_3$ in FIG. 9A, the MTF values between the central field of view and the corner field of view are from 75% to 88%. As shown by curve $L_1$ of FIG. 9B, when the imaging lens 100 is tested under 20 degrees Celsius, the MTF value of the central field of view of the imaging lens 100 is greater than 86%. As shown by curve $L_2$ of FIG. 9B, the MTF value of the corner field of view is greater than 74%. As shown by curve $L_3$ of FIG. 9B, The MTF values between the central field of view and the corner field of view are from 74% to 86%. Thus, the imaging lens 100 of Embodiment 2 has high-resolution imaging quality.

With the above configuration, the imaging lens 100 is largely unaffected by high temperatures by including a number of glass lens and plastic lenses. The plastic lenses serve to correct aberrations to improve the resolution of the imaging lens 100. The imaging lens 100 has a high relative illumination, so even at corner areas away from the imaging lens 100, images are still clearly formed. The imaging lens 100 also has a large field of view.

Figure 10:
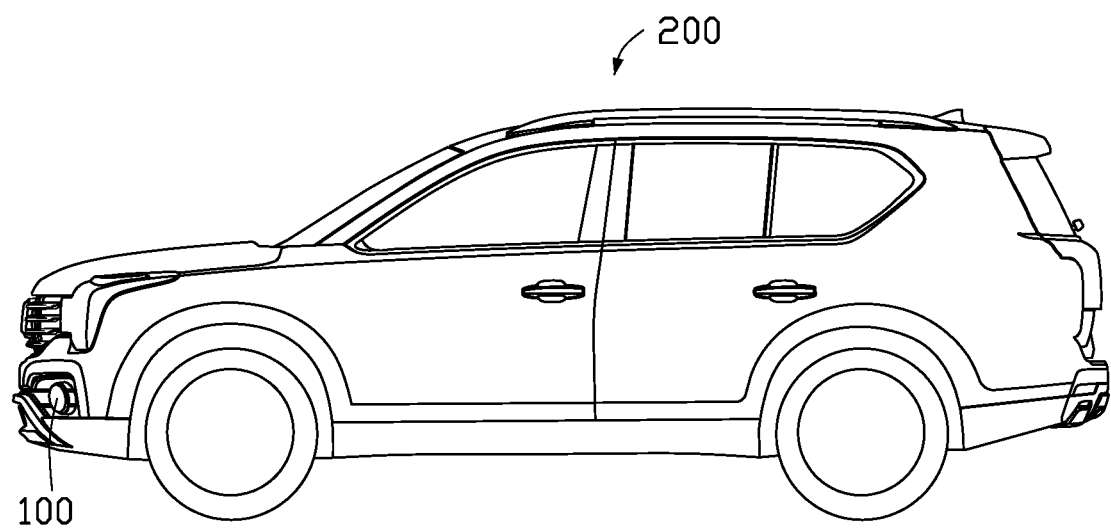
FIG. 10 is a diagrammatic view of an embodiment of an electronic device with the imaging lens installed therein, according to the present disclosure.

FIG. 10 illustrates an embodiment of an electronic device 200 having the above imaging lens 100. The electronic device 200 may be a tablet computer, a game machine, a television, a mobile phone, or a vehicle.

Even though information and advantages of the present embodiments have been set forth in the foregoing description, together with details of the structures and functions of the present embodiments, the disclosure is illustrative only. Changes may be made in detail, especially in matters of shape, size, and arrangement of parts within the principles of the present exemplary embodiments, to the full extent indicated by the plain meaning of the terms in which the appended claims are expressed.

What is claimed is:

1. An imaging lens, from an object side to an imaging side, comprising:
   a first lens with a negative power;
   a second lens with a negative power;
   a third lens with a positive power;
   a fourth lens with a negative power;
   a fifth lens with a positive power; and
   a sixth lens with a positive power;

wherein the first lens, the second lens, the fourth lens, the fifth lens, and the sixth lens satisfy following numbered conditions:

$$F1<0; \quad (1)$$

$$0.8>|F2/F6|>0.6, F2<0, F6>0; \quad (2)$$

$$-3>F4/F5>-2; \quad (3)$$

$$2.0<F/\#; \quad (4)$$

wherein, F1 denotes an effective focal length of the first lens, F2 denotes an effective focal length of the second lens, F4 denotes an effective focal length of the fourth lens, F5 denotes an effective focal length of the fifth lens, F6 denotes an effective focal length of the sixth lens, and F/# denotes the number of apertures;

wherein each of the first lens, the third lens, the fourth lens, and the fifth lens is made of glass, and each of the second lens and the sixth lens is made of plastic.

2. The imaging lens of claim 1, wherein the first lens comprises a first surface and a second surface from the object side to the imaging side, the second lens comprises a third surface and a fourth surface from the object side to the imaging side, the third lens comprises a fifth surface and a sixth surface from the object side to the imaging side, the fourth lens comprises a seventh surface and an eighth surface from the object side to the imaging side, the fifth lens comprises a ninth surface and a tenth surface from the object side to the imaging side, the sixth lens comprises an eleventh surface and a twelfth surface from the object side to the imaging side;

the first surface is convex toward the object side, the second surface is concave toward the imaging side, the third surface is concave toward the object side, the fourth surface is concave toward the imaging side, the fifth surface is convex toward the object side, the sixth surface is concave toward the imaging side, the seventh surface is concave toward the object side, the eighth surface is concave toward the imaging side, the ninth surface is convex toward the object side, the tenth surface is convex toward the imaging side, the eleventh surface is convex toward the object side, and the twelfth surface is concave toward the imaging side.

3. The imaging lens of claim 2, wherein the first lens, the second lens, the third lens, the fourth lens, the fifth lens, and the sixth lens satisfy at least one of following numbered conditions:

$$-2<R1/F1<-1, -0.7<R2/F1<0; \quad (5)$$

$$-3<R3/F2<-1, -0.7<R4/F2<0; \quad (6)$$

$$0.5<R5/F3<0.8, 6<R6/F3<10; \quad (7)$$

$$2<R7/F4<5, -0.3<R8/F4<0; \quad (8)$$

$$0.2<R9/F5<0.4, -0.8<R10/F5<-0.5; \quad (9)$$

$$0<R11/F6<0.4, 1.5<R12/F6<2.2, \quad (10)$$

wherein, R1 denotes a radius of curvature of the first surface, R2 denotes a radius of curvature of the second surface, R3 denotes a radius of curvature of the third surface, R4 denotes a radius of curvature of the fourth surface, R5 denotes a radius of curvature of the fifth surface, R6 denotes a radius of curvature of the sixth surface, R7 denotes a radius of curvature of the seventh surface, R8 denotes a radius of curvature of the eighth surface, R9 denotes a radius of curvature of the ninth surface, R10 denotes a radius of curvature of the tenth surface, R11 denotes a radius of curvature of the eleventh surface, R12 denotes a radius of curvature of the twelfth surface, and F3 denotes an effective focal length of the third lens.

4. The imaging lens of claim 3, wherein the first lens, the second lens, the third lens, the fourth lens, the fifth lens, and the sixth lens satisfy each of the numbered conditions:

$$-2<R1/F1<-1, -0.7<R2/F1<0; \quad (5)$$

$$-3<R3/F2<-1, -0.7<R4/F2<0; \quad (6)$$

$$0.5<R5/F3<0.8, 6<R6/F3<10; \quad (7)$$

$$2<R7/F4<5, -0.3<R8/F4<0; \quad (8)$$

$$0.2<R9/F5<0.4, -0.8<R10/F5<-0.5; \quad (9)$$

$$0<R11/F6<0.4, 1.5<R12/F6<2.2 \quad (10).$$

5. The imaging lens of claim 2, wherein at least one of the third surface, the fourth surface, the eleventh surface, and the twelfth surface is aspherical.

6. The imaging lens of claim 5, wherein each of the third surface, the fourth surface, the eleventh surface, and the twelfth surface is aspherical.

7. The imaging lens of claim 1, further comprising a stop disposed between the third lens and the fourth lens.

8. The imaging lens of claim 1, further comprising a filter disposed between the sixth lens and an imaging surface of the imaging lens.

9. The imaging lens of claim 8, further comprising a glass cover disposed on a side of the imaging surface facing the filter.

10. The imaging lens of claim 1, wherein the fourth lens and the fifth lens are connected to each other by an adhesive.

11. An electronic device, comprising:
an imaging lens, from an object side to an imaging side, comprising:
a first lens with a negative power;
a second lens with a negative power;
a third lens with a positive power;
a fourth lens with a negative power;
a fifth lens with a positive power; and
a sixth lens with a positive power;
wherein the first lens, the second lens, the fourth lens, the fifth lens, and the sixth lens satisfy following numbered conditions:

$$F1<0; \quad (1)$$

$$0.8>|F2/F6|>0.6, F2<0, F6>0; \quad (2)$$

$$-3>F4/F5>-2; \quad (3)$$

$$2.0<F/\#; \quad (4)$$

wherein, F1 denotes an effective focal length of the first lens, F2 denotes an effective focal length of the second lens, F4 denotes an effective focal length of the fourth lens, F5 denotes an effective focal length of the fifth lens, F6 denotes an effective focal length of the sixth lens, and F/# denotes the number of apertures;

wherein each of the first lens, the third lens, the fourth lens, and the fifth lens is made of glass, and each of the second lens and the sixth lens is made of plastic.

12. The electronic device of claim 11, wherein the first lens comprises a first surface and a second surface from the object side to the imaging side, the second lens comprises a third surface and a fourth surface from the object side to the imaging side, the third lens comprises a fifth surface and a sixth surface from the object side to the imaging side, the fourth lens comprises a seventh surface and an eighth surface from the object side to the imaging side, the fifth lens comprises a ninth surface and a tenth surface from the object side to the imaging side, the sixth lens comprises an eleventh surface and a twelfth surface from the object side to the imaging side;

the first surface is convex toward the object side, the second surface is concave toward the imaging side, the third surface is concave toward the object side, the fourth surface is concave toward the imaging side, the fifth surface is convex toward the object side, the sixth surface is concave toward the imaging side, the seventh surface is concave toward the object side, the eighth surface is concave toward the imaging side, the ninth surface is convex toward the object side, the tenth surface is convex toward the imaging side, the eleventh surface is convex toward the object side, and the twelfth surface is concave toward the imaging side.

13. The electronic device of claim 12, wherein the first lens, the second lens, the third lens, the fourth lens, the fifth lens, and the sixth lens satisfy at least one of following numbered conditions:

$$-2<R1/F1<-1, -0.7<R2/F1<0; \quad (5)$$

$$-3<R3/F2<-1, -0.7<R4/F2<0; \quad (6)$$

$$0.5<R5/F3<0.8, 6<R6/F3<10; \quad (7)$$

$$2<R7/F4<5, -0.3<R8/F4<0; \quad (8)$$

$$0.2<R9/F5<0.4, -0.8<R10/F5<-0.5; \quad (9)$$

$$0<R11/F6<0.4, 1.5<R12/F6<2.2, \quad (10)$$

wherein, R1 denotes a radius of curvature of the first surface, R2 denotes a radius of curvature of the second surface, R3 denotes a radius of curvature of the third surface, R4 denotes a radius of curvature of the fourth surface, R5 denotes a radius of curvature of the fifth surface, R6 denotes a radius of curvature of the sixth surface, R7 denotes a radius of curvature of the seventh surface, R8 denotes a radius of curvature of the eighth surface, R9 denotes a radius of curvature of the ninth surface, R10 denotes a radius of curvature of the tenth surface, R11 denotes a radius of curvature of the eleventh surface, R12 denotes a radius of curvature of the twelfth surface, and F3 denotes an effective focal length of the third lens.

14. The electronic device of claim 13, wherein the first lens, the second lens, the third lens, the fourth lens, the fifth lens, and the sixth lens satisfy each of the numbered conditions:

$$-2<R1/F1<-1, -0.7<R2/F1<0; \quad (5)$$

$$-3<R3/F2<-1, -0.7<R4/F2<0; \quad (6)$$

$$0.5<R5/F3<0.8, 6<R6/F3<10; \quad (7)$$

$$2<R7/F4<5, -0.3<R8/F4<0; \quad (8)$$

$$0.2<R9/F5<0.4, -0.8<R10/F5<-0.5; \quad (9)$$

$$0<R11/F6<0.4, 1.5<R12/F6<2.2 \quad (10).$$

15. The electronic device of claim 12, wherein at least one of the third surface, the fourth surface, the eleventh surface, and the twelfth surface is aspherical.

16. The electronic device of claim 15, wherein each of the third surface, the fourth surface, the eleventh surface, and the twelfth surface is aspherical.

17. The electronic device of claim 11, wherein the imaging lens further comprises a stop disposed between the third lens and the fourth lens.

18. The electronic device of claim 11, wherein the imaging lens further comprises a filter disposed between the sixth lens and an imaging surface of the imaging lens.

19. The electronic device of claim 18, wherein the imaging lens further comprises a glass cover disposed on a side of the imaging surface facing the filter.

20. The electronic device of claim 11, wherein the fourth lens and the fifth lens are connected to each other by an adhesive.

* * * * *